Jan. 3, 1956    F. L. HAMEL    2,729,305
GREASE PACKER FOR ANTIFRICTION BEARINGS
Filed March 25, 1954

INVENTOR.
Frederic L. Hamel,
BY George D. Richards
Attorney

United States Patent Office 2,729,305
Patented Jan. 3, 1956

2,729,305

GREASE PACKER FOR ANTIFRICTION BEARINGS

Frederic L. Hamel, Montclair, N. J.

Application March 25, 1954, Serial No. 418,651

4 Claims. (Cl. 184—1)

This invention relates to improved apparatus for packing antifriction bearings with a semi-solid lubricant.

In the use of antifriction bearings of both the roller and ball types, it is customary to fill the interstices intermediate the rotative elements thereof and intermediate these elements and the bodies and cages by which they are supported with a lubricating grease. It is necessary, from time to time, to remove old lubricating grease from such bearings, and then to repack the same with fresh clean grease. Ordinarily, the operations of packing and repacking such bearings is a messy, time consuming, and laborious task, and often involves no inconsiderable waste of lubricating grease.

Having the above in view, it is an object of this invention to provide an improved grease packer for antifriction bearings by means of which thorough charging of the bearing operated upon is easily accomplished in a rapid and cleanly manner, and under conditions whereby the bearing operated upon remains under observation of the operator, so that a completely charged state of the bearing can be visually ascertained, all to the end that the packing operation can be effected without risk of substantial loss or waste of lubricating grease.

The invention has for another object to provide a grease packer comprising a support for the bearing to be operated upon, on which support said bearing is disposed with its end of major diameter upwardly presented, said support having an axially extending conical grease deflector detachably connected therewith in upward projection therefrom and adapted to guide flow of grease to an annular opening in the bearing intermediate the inner body and external cage thereof, and a grease loaded, downwardly open cylinder having a piston therein for discharging grease therefrom, said cylinder having an internal annular recess within its open end to receive the seat upon the upper margin of the cage of the bearing operated upon, whereby to couple said cylinder in grease discharging relation to said bearing, preferably in such manner as to leave the latter exposed to sight.

Figure 1:
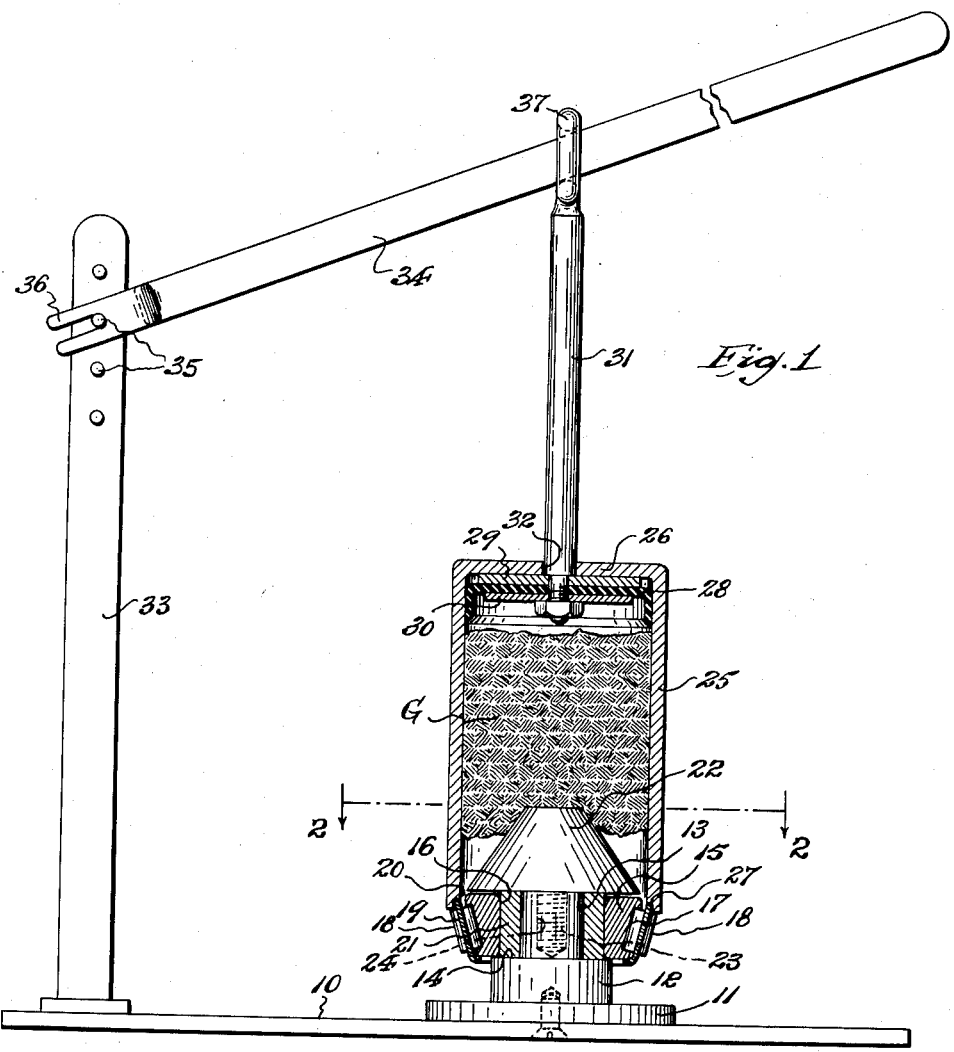
Figure 2:
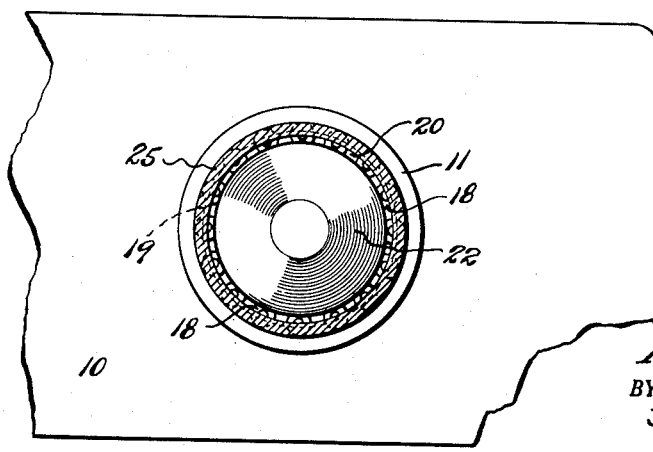

The above and other objects will be understood from a reading of the following detailed description of this invention in connection with the accompanying drawings, in which:

Fig. 1 is a side elevational view, in part longitudinal section, of the grease packer of this invention as initially conditioned preparatory to operation thereof, the bearings to be packed, as shown, being of the roller type; and Fig. 2 is a horizontal sectional view, taken on line 2—2 in Fig. 1.

Referring to the drawings, in which like characters of reference indicate corresponding parts, the reference character 10 indicates a bed plate upon which is suitably affixed means to support a bearing to be packed with lubricating grease. In a preferred form thereof, as shown, said bearing support comprises a base member 11 having an upstanding supporting column 12 of a diameter in excess of the internal diameter of a bearing to be operated upon, said supporting column being provided with an axially and upwardly projecting post 13 of reduced diameter and of a height approximating the height of a bearing to be operated upon. At the juncture of said supporting column 12 and post 13, the upper end of the former provides an annular seating shoulder 14, horizontal in plane, upon which a bearing to be packed is mounted.

To illustrate the function of the bearing support, a bearing of the roller type is shown operatively mounted thereon subject to a grease packing treatment thereof. Said bearing comprises an inner body or race ring 15 having an internal axial opening 16, and an external circumferential recess 17 in which the antifriction rollers 18 run. Said rollers 18 are held in assembled relation to the body or race ring 15 by an external slotted cage 19, through the slots of which the peripheries of the roller project. The cage 19 is outwardly spaced from and concentric to the body or race ring 15, thus providing, at least between the ends of these parts which are of major diameter, an annular inlet opening or mouth 20, which leads into the space between the body or race ring and the cage and into the interstices intermediate the rollers 18 which are held between these parts.

To operatively mount the bearing on the supporting column 12, said bearing is positioned with its end of major diameter upwardly presented, and is then passed over the post 13, so as to surround the latter, with its end of minor diameter seated upon the seating shoulder 14 of the supporting column. Since the internal diameters of bearing bodies or race rings may vary with respect to a given size of bearing, any such variation can be compensated by inserting an appropriately sized bushing 21 intermediate the post 13 and the body or race ring of the bearing to be mounted on the bearing support.

After the bearing to be operated upon is mounted on the supporting column 12, a grease deflecting and guide means is attached to the bearing support in overlying relation to the mounted bearing. This grease deflecting and guide means comprises a conical deflector member 22, the bottom end diameter of which approximates but is not substantially in excess of the major diameter of the body or race ring 15 of the mounted bearing. Said conical deflector member 22 is provided with an axial externally screw-threaded shank 23 dependent from its bottom end. The post 13 of the bearing support is provided with an upwardly open, internally screw-threaded, axial socket 24 into which the shank 23 of the conical deflector member 22 is entered, whereby to couple the latter to the bearing support in overlying relation to the bearing mounted thereon.

The means for charging the supported bearing with grease comprises a downwardly open cylinder member 25, which is closed at its upper end by a top wall 26. Said cylinder member is of such size that its internal diameter approximates the internal major diameter of the bearing cage 19. Formed in the open bottom end of the cylinder member is an internal annular recess 27 to receive and seat the upper margin of the bearing cage 19, whereby to detachably couple the cylinder member in grease delivering relation to the supported bearing. Slidably fitting the interior of the cylinder member 25 is a plunger which is formed, for example, by an inverted cup-leather 28 supported between upper and lower rigid face plates 29 and 30, although it will be understood that any other suitable plunger construction can be used. The plunger is suitably affixed to the lower end of an upwardly projecting plunger rod 31, which slidably extends through an opening 32 with which the top wall of the cylinder member is provided.

In the use of the grease packer, the plunger can be directly operated by hand, preferably however actuating lever means is provided for this purpose. In the latter case, an upstanding fulcrum post 33 is mounted on the bed plate 10 in offset spaced relation to the bearing support. Means is provided for pivotally, and preferably detachably and adjustably, connecting with the fulcrum post a lever member 34 by which the plunger rod 31 can be reciprocated. An illustrative arrangement to this end comprises the provision of a plurality of transversely projecting fulcrum pins 35, vertically spaced in connection with the fulcrum post, so as to be selectively engageable by a forked, bifurcated inner end portion 36 of said lever member, whereby to fulcrum the latter in connection with the fulcrum post. The plunger rod 31 is provided with means engageable by the lever member 34, whereby reciprocating movement can be imparted to the former by the latter. An illustrative means for so relating the lever member to the plunger rod, as shown, comprises a coupler loop 37 through which the lever member can be extended from the fulcrum post. Any other suitable means may be provided for operatively connecting the lever member with the plunger rod.

To prepare the packer for operation the cylinder member 25 is removed from the bearing support and its plunger rod 31 is disconnected from the lever member 34. The plunger being drawn up into the upper end of the cylinder member, the interior of the latter is supplied with lubricating grease G.

The bearing to be operated upon having been mounted on the supporting column 12, and the conical deflector member 22 having been attached to the bearing support to overlie said bearing, the grease filled cylinder member 25 is operatively assembled with the supported bearing by telescopic engagement of the upwardly presented margin of the cage 19 of the bearing in the internal annular recess 27 with which the bottom open end of the cylinder member is provided. This having been done, the lever member 34 is engaged with the plunger rod 31 and fulcrumed upon the fulcrum post 33, whereupon the packer is ready to be actuated so as to charge the supported bearing with a filling of the lubricating grease G. To operate the packer, the operator presses down the lever member 34, whereby to cause downward movement of the plunger in the cylinder member, thus forcing the grease contained therein outwardly therefrom. The outwardly moving grease, as it passes the conical deflector member 22 is deflected thereby so as to be guided to and through the annular inlet opening or mouth 20 intermediate the body or race ring 15 and cage 19 of the bearing, being thence forced into the interior of said bearing so as to fill the space between said cage and race ring and around the rollers 18. Since the supported bearing is under observation of operator during the packing operation, when the grease begins to ooze outwardly through the slotted cage of the bearing, the operator is immediately warned by sight thereof, that the bearing has received a full charge of the grease, and consequently may immediately discontinue grease expelling operation of the plunger, with the consequence that no waste or loss of grease occurs. After the bearing operated upon is thus charged with grease, the cylinder member is removed, the conical deflector member is detached, whereupon the grease packed bearing can be removed from the support, and replaced by another bearing desired to be packed; the packing of which is accomplished by repetition of the above described operations.

It will be understood that the bearing supports and cooperating cylinder members will be furnished in various respective sizes to accommodate respectively different sizes of bearings. It will also be understood, without necessity for illustration, that a selection of different sizes of bearing supports can, if desired, be mounted on a common bed plate in radial relation to a common fulcrum post and associated lever member so as to be selectively usable according to given different sizes of bearings to be packed.

Although, for purposes of illustration, the grease packer of this invention has been shown in operative relation to a supported antifriction bearing of the roller type, it will be understood that antifriction bearings of the ball type can also be supported and packed by the apparatus.

Having now described my invention, I claim:

1. Apparatus for packing an antifriction bearing with lubricating grease, said bearing having a race ring and a surrounding cage in concentric outwardly spaced relation thereto to hold antifriction elements assembled therewith, said apparatus comprising a fixed supporting column having an annular seat upon which the bearing to be packed is supported, a downwardly open cylinder member to contain packing grease, means to seat the lower open end of said cylinder member upon the upwardly presented end margin of the cage of the supported bearing and outwardly of the space intermediate the latter and the race ring, a plunger reciprocable in said cylinder member operative to discharge grease from the latter, means to actuate said plunger, and a conical deflector means detachably connected with said supporting column to overlie the race ring of the supported bearing, said deflector means being of diameter less than the internal diameter of the cylinder member and not in excess of the diameter of the race ring, whereby to deflect and guide grease discharged from the cylinder member into the internal space between the race ring and cage of the bearing.

2. Apparatus for packing an antifriction bearing with lubricating grease, said bearing having a race ring and a surrounding cage in concentric outwardly spaced relation thereto to hold antifriction elements assembled therewith, said apparatus comprising a fixed supporting column having an annular seat upon which the bearing to be packed is supported in exposed concentric relation thereto, a downwardly open cylinder member to contain packing grease, said cylinder member having an internal annular recess at its lower open end to receive the upwardly presented end marginal portion of the cage of the supported bearing, whereby to detachably couple the cylinder member with the supported bearing in communication with the space intermediate the race ring and cage of the latter, a plunger reciprocable in said cylinder member operative to discharge grease from the latter, means to actuate said plunger, and a conical deflector member detachably connected with the supporting column to overlie the race ring of the supported bearing, said deflector means being of diameter less than the internal diameter of the cylinder member and not in excess of the diameter of the race ring, whereby to deflect and guide grease discharged from the cylinder member into the internal space between the race ring and cage of the bearing.

3. Apparatus for packing an antifriction bearing with lubricating grease according to claim 2 wherein the means for actuating the plunger comprises a plunger rod extending upwardly from the plunger exteriorly of the cylinder member, an upstanding fulcrum post disposed in laterally offset relation to the supporting column, and a lever member fulcrumed by said fulcrum post and engageable with the plunger rod for reciprocating the plunger.

4. Apparatus for packing an antifriction bearing with lubricating grease, said bearing having a race ring and a surrounding cage in concentric outwardly spaced relation thereto to hold antifriction elements assembled therewith, said apparatus comprising a bed plate, a supporting column affixed to said bed plate to upstand therefrom, said supporting column having an annular seat upon which the bearing to be packed is supported in exposed concentric relation to said supporting column, a downwardly open cylinder member to contain packing grease, said cylinder member having an internal annular recess at its lower open end to receive the upwardly presented marginal portion of the cage of the supported bearing, whereby to detachably couple the cylinder member with the supported bearing in communication with the space intermediate the race ring and cage of the latter, a plunger reciprocable in said cylinder member operative to discharge grease from the latter, a plunger rod extending upwardly from said plunger exteriorly of the cylinder member, a fulcrum post upstanding from the bed plate in laterally offset relation to the supporting column, bearing and cylinder member assembly, a lever member fulcrumed by the fulcrum post and engageable with the plunger rod for reciprocating the plunger, and a conical deflector member detachably connected with the supporting column to project into the cylinder member and to overlie the race ring of the supported bearing, the bottom end diameter of said conical deflector member being less than the internal diameter of the cylinder member and not in excess of the external diameter of said race ring, whereby said conical deflector member is operative to deflect and guide grease discharged from the cylinder member into the internal space between the race ring and cage of the bearing.

References Cited in the file of this patent

UNITED STATES PATENTS

| | | |
|---|---|---|
| 1,991,542 | Cavanaugh | Feb. 19, 1935 |
| 2,187,608 | Kropp | Jan. 16, 1940 |
| 2,599,456 | Ivie | June 3, 1952 |

FOREIGN PATENTS

| | | |
|---|---|---|
| 597,766 | Great Britain | Feb. 2, 1948 |